(12) United States Patent
Millner et al.

(10) Patent No.: US 8,911,700 B2
(45) Date of Patent: Dec. 16, 2014

(54) PROCESS AND INSTALLATION FOR PRODUCING SUBSTITUTE GAS

(75) Inventors: Robert Millner, Loosdorf (AT); Jan-Friedemann Plaul, Linz (AT); Kurt Wieder, Schwertberg (AT)

(73) Assignee: Siemens Vai Metals Technologies GmbH (AT)

( * ) Notice: Subject to any disclaimer, the term of this patent is extended or adjusted under 35 U.S.C. 154(b) by 782 days.

(21) Appl. No.: 13/202,624

(22) PCT Filed: Feb. 3, 2010

(86) PCT No.: PCT/EP2010/051310
§ 371 (c)(1),
(2), (4) Date: Sep. 26, 2011

(87) PCT Pub. No.: WO2010/094566
PCT Pub. Date: Aug. 26, 2010

(65) Prior Publication Data
US 2012/0020868 A1    Jan. 26, 2012

(30) Foreign Application Priority Data

Feb. 20, 2009    (AT) .................................. A283/2009

(51) Int. Cl.
| C21B 13/00 | (2006.01) |
| C21B 5/06 | (2006.01) |
| F01N 3/10 | (2006.01) |
| C01B 31/00 | (2006.01) |

(52) U.S. Cl.
CPC . *C21B 5/06* (2013.01); *C21B 13/00* (2013.01); Y02C 10/08 (2013.01)
USPC ....... 423/437.1; 423/220; 422/173; 75/10.63; 75/433; 75/443; 266/155; 266/156

(58) Field of Classification Search
CPC .......... C21B 13/00; C21B 13/14; C21B 5/06; C21B 31/20; Y02C 10/08; F01N 3/10
USPC ............... 423/220, 437.1; 422/173; 75/10.63, 75/433, 443, 468, 505; 95/96, 139; 266/155, 156, 140, 144
See application file for complete search history.

(56) References Cited

U.S. PATENT DOCUMENTS

| 3,019,100 A | 1/1962 | Robson ............................. 75/26 |
| 4,579,588 A | 4/1986 | van Langen ....................... 75/35 |

(Continued)

FOREIGN PATENT DOCUMENTS

| AT | 406380 B | 4/2000 | ............. C21B 13/14 |
| AT | 406485 B | 5/2000 | ............. C21B 13/14 |

(Continued)

OTHER PUBLICATIONS

International PCT Search Report, PCT/EP2010/050374, 15 pages, May 13, 2011.

(Continued)

*Primary Examiner* — Stanley Silverman
*Assistant Examiner* — Kallambella Vijayakumar
(74) *Attorney, Agent, or Firm* — Ostrolenk Faber LLP (57) ABSTRACT

A process and an installation for reducing particulate material containing iron oxide are shown, wherein the material containing iron oxide is at least partially reduced with reducing gas in a reducing zone and the waste gas produced during the reduction is drawn off and subsequently subjected to $CO_2$ cleaning in a $CO_2$ separating device (1), in which a tail gas containing $CO_2$ is separated. The tail gas is subjected to combustion and subsequent dewatering in a dewatering device (5), the substitute gas thereby formed being used as a substitute for inert gas.

16 Claims, 4 Drawing Sheets

(56) References Cited

U.S. PATENT DOCUMENTS

| | | | |
|---|---|---|---|
| 4,883,390 A | 11/1989 | Reintjes et al. | 406/24 |
| 5,139,568 A | 8/1992 | Geiger | 75/501 |
| 5,198,019 A | 3/1993 | Dry et al. | 75/500 |
| 5,340,378 A | 8/1994 | Huestis | 75/414 |
| 5,447,551 A | 9/1995 | Huestis et al. | 75/414 |
| 5,961,690 A | 10/1999 | Kepplinger et al. | 75/446 |
| 6,045,602 A | 4/2000 | Shah et al. | 75/466 |
| 6,214,084 B1 | 4/2001 | Saxena et al. | 75/453 |
| 6,214,085 B1 | 4/2001 | Calderon et al. | 75/486 |
| 6,251,162 B1* | 6/2001 | Eichberger et al. | 75/492 |
| 6,379,420 B1* | 4/2002 | Kepplinger et al. | 75/414 |
| 6,478,841 B1* | 11/2002 | Faccone et al. | 75/10.63 |
| 6,562,103 B2* | 5/2003 | Sethna et al. | 75/505 |
| 2010/0024599 A1 | 2/2010 | Hauzenberger et al. | 75/380 |
| 2010/0043599 A1 | 2/2010 | Hauzenberger et al. | 75/573 |
| 2011/0120266 A1 | 5/2011 | Bürgler et al. | 75/433 |
| 2011/0138965 A1 | 6/2011 | Boehm et al. | 75/505 |
| 2012/0020868 A1 | 1/2012 | Millner et al. | 423/437.1 |
| 2012/0036961 A1 | 2/2012 | Millner | 75/443 |

FOREIGN PATENT DOCUMENTS

| | | | |
|---|---|---|---|
| CN | 1045127 A | 9/1990 | C21B 11/00 |
| DE | 102004036767 A1 | 3/2005 | C21B 5/06 |
| DE | 102006048600 A1 | 4/2008 | C21B 13/00 |
| DE | 102006048601 A1 | 4/2008 | C21B 13/00 |
| EP | 0488429 A2 | 6/1992 | C21B 13/14 |
| EP | 0997693 A2 | 5/2000 | F25J 3/04 |
| JP | 2007009069 A | 1/2007 | C01B 3/02 |
| RU | 2060281 C1 | 5/1996 | |
| RU | 2192476 C2 | 11/2002 | |
| WO | 2006/075977 A1 | 7/2006 | C21B 13/14 |
| WO | 2006/087803 A1 | 8/2006 | F02C 7/22 |
| WO | 2007/133050 A1 | 11/2007 | C21B 11/00 |
| WO | 2009/146982 A1 | 12/2009 | C21B 13/14 |
| WO | 2010/006905 A1 | 1/2010 | C21B 13/00 |
| WO | 2010/086229 A1 | 8/2010 | C21B 13/00 |
| WO | 2010/094566 A1 | 8/2010 | C21B 13/00 |

OTHER PUBLICATIONS

International PCT Search Report, PCT/EP2010/051310, 14 pages, May 25, 2011.

\* cited by examiner

PROCESS AND INSTALLATION FOR PRODUCING SUBSTITUTE GAS

CROSS-REFERENCE TO RELATED APPLICATIONS

This application is a U.S. National Stage Application of International Application No. PCT/EP2010/051310 filed Feb. 3, 2010, which designates the United States of America, and claims priority to Austrian Patent No. A283/2009 filed Feb. 20, 2009, the contents of which are hereby incorporated by reference in their entirety.

TECHNICAL FIELD

The invention relates to a process and an installation for reducing particulate material containing iron oxide, wherein the material containing iron oxide is at least partially reduced with reducing gas in a reducing zone and the waste gas produced during the reduction is drawn off and subjected to $CO_2$ cleaning, in which a tail gas containing $CO_2$ is separated.

BACKGROUND

It is known from the prior art that reducing gas that is drawn off as top gas from a reducing zone after the reduction process is passed on for renewed use. In this respect, it is known that the top gas is first cleaned and the $CO_2$ is separated from the top gas. By separating the $CO_2$ and/or $H_2O$, the production potential of the top gas can be increased and it can be used again for reduction.

The tail gas containing $CO_2$ that is obtained during the $CO_2$ cleaning has a varying composition. It is known from the prior art that the tail gas is thermally utilized, it being possible for the energy thereby produced to be used in the process.

A disadvantage of this is that there may still be considerable amounts of waste gas that have to be discharged into the atmosphere.

SUMMARY

According to various embodiments, a process and an installation can be provided which make it possible for the tail gas to be used as a substitute for inert gas in the process while reducing the environmental impact.

According to an embodiments, in process for reducing particulate material containing iron oxide, the material containing iron oxide is at least partially reduced with reducing gas in a reducing zone and the gas produced during the reduction as waste gas is drawn off and subsequently subjected to CO2 separation, in which a tail gas containing CO2 is separated, wherein, optionally after being temporarily stored in a gas accumulator, the tail gas is mixed with a gas containing oxygen, in particular with pure oxygen, in a burner system and combusted, thereby forming a substitute gas, the substitute gas being used after dewatering as a substitute for inert gas, in particular instead of nitrogen.

According to a further embodiment, after combustion, the substitute gas can be cooled in at least one stage, in particular to a temperature of 20 to 60° C., and dewatered and compressed and optionally dried. According to a further embodiment, the combustion of the mixture of tail gas and gas containing oxygen may take place in a combustion chamber. According to a further embodiment, the tail gas can be introduced into the burner system by means of a blower or a compressor, in particular with the amount being regulated by way of flow rate control. According to a further embodiment, at least part of the substitute gas can be mixed with the gas containing oxygen and is returned to the burner system, optionally after dewatering and/or compression. According to a further embodiment, the quantitative feeding of the returned substitute gas to the burner system may take place in such a way that the flame temperature is kept constant during the combustion of the gases. According to a further embodiment, before the combustion, the tail gas can be mixed with top gas, offgas or surplus gas from a reduction or smelting reduction process. According to a further embodiment, the dewatered and compressed, and optionally dried, substitute gas can be used in barrier gas systems of an oxide and/or coal charging operation or as propellant gas of a coal injection operation or for cooling burner lances or as a flushing and cooling gas or for controlling the flame temperature of a raceway or in burner systems or as a carrier gas for pneumatic conveyance. According to a further embodiment, the tail gas and/or the gas containing oxygen and/or the returned substitute gas can be preheated before the combustion and using the waste heat produced during the combustion.

According to another embodiment, an installation for reducing particulate material containing iron oxide, may comprise a reduction unit, in which the material containing iron oxide is at least partially reduced by means of a reducing gas and the reducing gas is drawn off as top gas, and subsequently with a CO2 separating device for separating CO2 from the top gas, thereby forming a tail gas containing CO2, wherein there is provided a burner system for mixing the tail gas with a gas containing oxygen, in particular pure oxygen, and optionally a gas accumulator for temporarily storing the tail gas before it is mixed with the gas containing oxygen, and a combustion chamber, into which these gases can be introduced and combusted, thereby forming a substitute gas, and discharged by way of a substitute-gas discharge line, and a cooling or waste-heat recovering device including a dewatering device for separating water from the substitute gas, thereby forming a substitute for inert gas, in particular instead of nitrogen.

According to a further embodiment of the installation, at least one compressor, which serves for compressing the mixture of tail gas and gas containing oxygen, and optionally returned substitute gas, can be arranged between the gas accumulator and the burner system. According to a further embodiment of the installation, at least one substitute gas compressor can be provided for compressing the dewatered substitute gas. According to a further embodiment of the installation, a blower or a compressor, and optionally a flow-rate controller, can be provided for feeding the tail gas into the burner system. According to a further embodiment of the installation, a return line can be provided for returning part of the dewatered substitute gas and for introducing it into the burner system after admixing oxygen, this line branching off from the substitute gas line downstream of the dewatering device. According to a further embodiment of the installation, a compressor for compressing the returned substitute gas can be provided in the return line. According to a further embodiment of the installation, a further dewatering device can be provided for dewatering the compressed substitute gas. According to a further embodiment of the installation, the dewatering device may comprise a cooling or waste-heat recovering device and a condensate separator for separating water from the substitute gas. According to a further embodiment of the installation, a further compressor can be arranged downstream of the branching off of the return line from the substitute gas line.

BRIEF DESCRIPTION OF THE DRAWINGS

The invention is explained in more detail below by way of example on the basis of FIGS. 1 to 4.

DETAILED DESCRIPTION

The process according to various embodiments has the effect of forming a substitute gas which, as a result of the combustion, in particular with pure oxygen, no longer has any combustible components and therefore, after dewatering, has a profile of characteristics that corresponds to that of an inert gas, and can consequently be used as a low-cost alternative instead of inert gases. One advantage of using the tail gas for producing an inert gas is that it has a very low nitrogen ($N_2$) content. Furthermore, use of the tail gas has the effect of reducing $CO_2$ emissions and operating costs for the iron producing process. It is advisable to use for the combustion technically pure oxygen or at least a gas containing oxygen that has an oxygen component of at least 90%, advantageously over 99%. In this respect, it is possible to produce a substitute gas with a $CO_2$ content >95%, which then only contains small proportions of nitrogen and oxygen.

The tail gas may be obtained from the waste gas of a reduction process. In this respect, top gas, for example from a blast furnace or a reduction shaft, or offgas from a fluidized bed unit or surplus gas from a smelting production process may be used.

In the reduction of the particulate material containing iron oxide in the reducing zone, it may be that first a sponge iron is produced and subsequently smelted into pig iron, but it is also conceivable that this takes place continuously in a blast furnace, where a smelting reduction takes place.

The process according to various embodiments allows inert gases containing nitrogen that are often used in metallurgical installations and processes to be substituted. Nitrogen in the inert gas has the disadvantage, particularly during the recycling of process gases, that there is an enrichment of the nitrogen, which technically can only be eliminated again in a very complex and consequently uneconomical operation. On account of the use of the substitute gas instead of nitrogen, separation of the $CO_2$ from a recycled process gas can take place much more easily by known technical processes. Since the overall amount of gas is reduced because, unlike the inert gas, the substitute gas can be separated, the power consumption is also reduced and the installations for producing iron and for recycling the process gases can be made smaller and less costly.

Furthermore, the substitute gas is suitable for the sequestration of $CO_2$, since many sequestration processes have demanding requirements for the purity of the gas.

According to an embodiment of the process, after combustion, the substitute gas is cooled in at least one stage, in particular to a temperature of 20 to 60° C., and dewatered and compressed and optionally dried. The cooling of the hot substitute gas may have the effect for example that moisture is precipitated by means of condensation, and consequently the substitute gas is dewatered. This is important when it is used as a substitute for inert gas, since otherwise condensation may occur in supply lines, and this may result in corrosion and operational problems. The compression has the effect of bringing the substitute gas to a pressure level such as that required for industrially conventional applications. Since the tail gas from the $CO_2$ separation has low pressures of approximately 0.1 bar, compression of the substitute gas is necessary. Optional drying can have the effect of further lowering the moisture content of the substitute gas.

According to various embodiments, the combustion of the mixture of tail gas and gas containing oxygen takes place in a combustion chamber. The combustion chamber makes it possible for combustion to take place under controlled conditions, aiming in particular for complete combustion. Furthermore, the combustion temperature can be kept within certain ranges, so that stable operation under largely constant conditions is possible. This is advisable since, seen over time, the tail gas cannot have a constant composition, and therefore the combustion must be correspondingly influenced.

According to an embodiments of the process, the tail gas is introduced into the burner system by means of a blower or a compressor, in particular with the amount being regulated by way of flowrate control. When it leaves the $CO_2$ cleaning, the tail gas has a low pressure, it also being possible for the amount and pressure level thereof to fluctuate as a result of the process. The blower and a flowrate control allow the amount of tail gas to be specifically set, and consequently introduced into the burner system. The tail gas may optionally be temporarily stored in a gas accumulator, in order for example to balance out fluctuations in the composition and amount, it being possible in particular to balance out fluctuations in the calorific value, and consequently to obtain combustion under stable conditions.

According to a further embodiment of the process, at least part of the substitute gas is mixed with the gas containing oxygen and is returned to the burner system, optionally after dewatering and/or compression. After the dewatering, the pressure level of the substitute gas may be adapted. The return of the substitute gas allows the mixture of gas to be combusted and the gas containing oxygen to be modified, the proportions of combustible components in the gas mixture being changed.

The procedure according to various embodiments allows, for example, the combustion temperature or the temperature of the combustion chamber and of the substitute gas to be set. Consequently, the formation of nitrogen oxides ($NO_x$) can be prevented, or at least considerably reduced.

According to an embodiment of the process, the quantitative feeding of the returned substitute gas to the burner system takes place in such a way that the flame temperature is kept constant during the combustion of the gases. It is consequently possible to ensure combustion under optimized and constant conditions.

According to an embodiment of the process, before the combustion, the tail gas is mixed with top gas, offgas or surplus gas from a reduction or smelting reduction process. After the reduction of particulate material containing iron oxide, reducing gases are drawn off from the reducing zone. In the case of a reduction shaft or in the case of a blast furnace, this gas is referred to as top gas, in the case of a fluidized bed unit it is referred to as offgas. Furthermore, reducing gas that is not currently required in the process, known as surplus gas, can similarly be used. The addition of said gases allows the combustion temperature and the amount of substitute gas to be influenced or set.

According to an embodiment of the process, the dewatered and compressed, and optionally dried, substitute gas is used in barrier gas systems of an oxide and/or coal charging operation or as propellant gas of a coal injection operation or for cooling burner lances or as a flushing and cooling gas or for controlling the flame temperature of a raceway or in burner systems or as a carrier gas for pneumatic conveyance. The high proportion of $CO_2$ allows the dewatered and compressed substitute gas to be used in a large number of applications, it being possible for the industrially widely used nitrogen or other inert gases to be substituted. A raceway is understood by a person skilled in the art as meaning the bubble-shaped cavity forming in a metallurgical reactor during blasting.

According to an embodiment of the process, the tail gas and/or the gas containing oxygen and/or the returned substitute gas is preheated before the combustion and using the waste heat produced during the combustion. The waste heat from the combustion in the combustion chamber may be used for preheating said gases, so that a still more accurate setting of the temperature during the combustion is achieved. This also allows the composition of the substitute gas, such as for example the $NO_x$ components, to be controlled.

The installation according to various embodiments has the advantage that the tail gas containing $CO_2$ from a $CO_2$ separating device can be converted in an optimized manner to a no longer combustible and relatively unhazardous substitute gas by an installation of a simple construction. Provided for this purpose is a burner system for mixing the tail gas with a gas containing oxygen, in particular pure oxygen, and a combustion chamber, into which these gases can be introduced and combusted, thereby forming a substitute gas, and discharged by way of a substitute-gas discharge line. Optionally, a gas accumulator may be provided for temporarily storing the tail gas before it is mixed with the gas containing oxygen in the burner system. The gas accumulator allows the composition of the tail gas to be largely homogenized, since the tail gas has, as a result of the process, fluctuations with regard to its composition, and consequently its calorific value, so that stable combustion under largely constant conditions can be ensured.

The substitute gas line connects the combustion chamber to a dewatering device for separating water from the substitute gas. The then dewatered substitute gas may be fed to the inert gas consumers by way of industrially conventional inert gas systems. On account of the very high proportion of $CO_2$ and the low proportions of $N_2$, this substitute gas is suitable for a large number of applications. A very intimate mixture of the tail gas with the gas containing oxygen is achieved by the burner system, so that complete combustion of the combustible components of the tail gas can be ensured.

Conventional $CO_2$ separating devices operate, for example, on the principle of pressure swing adsorption or vacuum pressure swing adsorption and are known to a person skilled in the art.

According to an embodiment of the installation, at least one compressor which serves for compressing the tail gas is arranged between the gas accumulator and the combustion chamber. The compression before the combustion has the advantage that the components of the installation can be operated at higher pressure, and consequently can be made more compact.

One possible variant of the installation provides that at least one substitute gas compressor is provided for compressing the dewatered substitute gas. Consequently, the pressure level can be adapted for the further use of the substitute gas.

According to an embodiment of the installation, a blower or a compressor, and optionally a flowrate controller, are provided for feeding the tail gas into the burner system. Since, as a result of the process, the tail gas has a very low pressure, it must be supplied by means of a blower or compressor, this also comprising quantitative control of the tail gas.

According to an embodiment of the installation, a return line is provided for returning part of the dewatered substitute gas and for introducing it into the burner system after admixing oxygen, this line branching off from the substitute gas line downstream of the dewatering device. Consequently, if required, part of the dewatered substitute gas can be returned into the burner system, whereby the combustion can be influenced by the feeding in of non-combustible components.

According to an embodiment of the installation, a further dewatering device is provided for dewatering the compressed substitute gas. The additional dewatering has the effect of achieving a still lower moisture content in the substitute gas.

According to an embodiment of the installation, the dewatering device comprises a cooling and waste-heat recovering device and a condensate separator for separating water from the substitute gas. Dewatering by means of condensation is a tried-and-tested technology.

According to an embodiment of the installation, a further compressor is arranged downstream of the branching off of the return line from the substitute gas line. The compressor allows the pressure of the substitute gas that is not returned to be separately set and adapted for the subsequent use.

Figure 1:
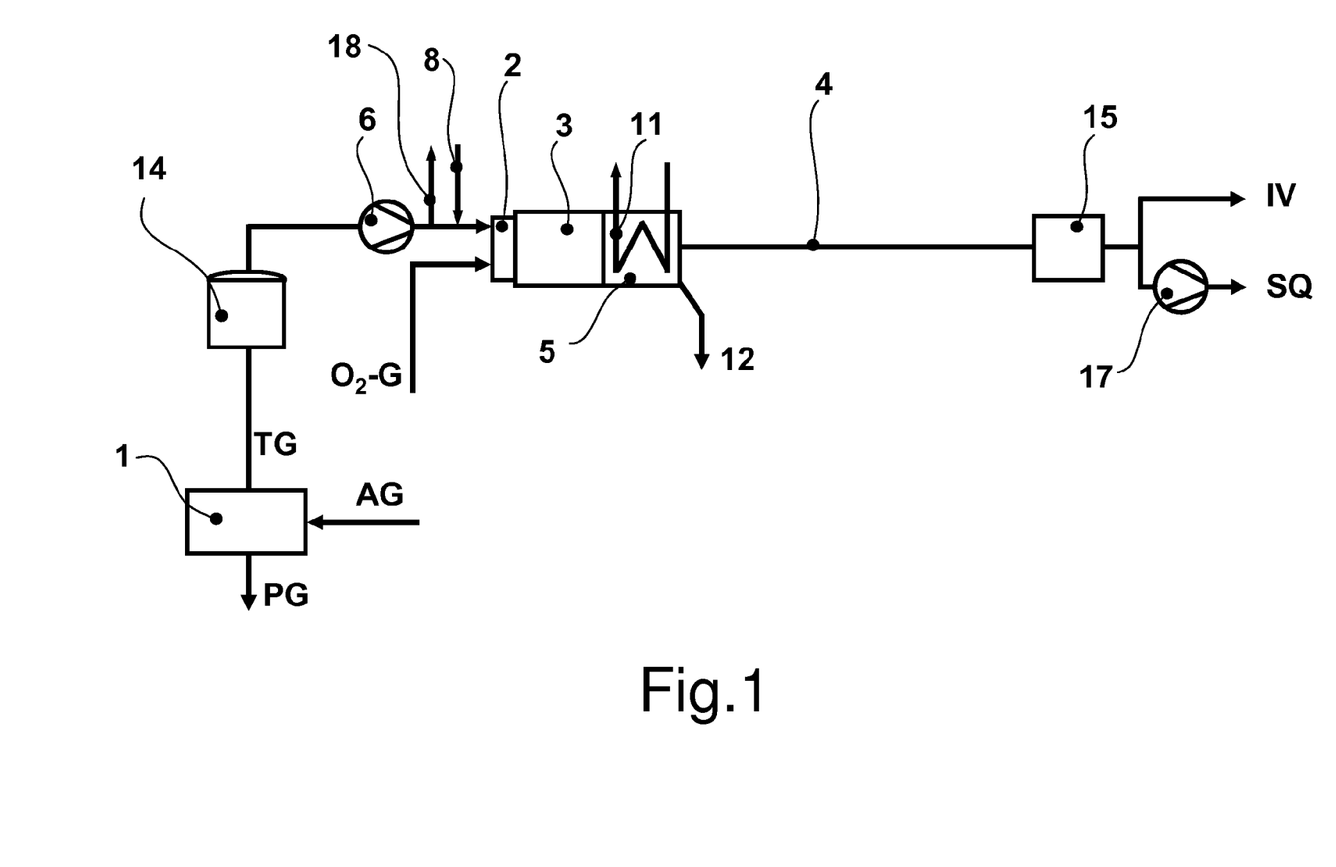
FIGS. 1 and 2: installations for producing substitute gas, in two embodiments.

FIG. 1 shows an installation according to various embodiments for producing substitute gas. From a reduction unit that is not represented, which may be a blast furnace, a reduction shaft, a fluidized-bed unit or else a melter gasifier, the drawn-off waste gas AG, that is to say the reducing gas already used for reduction, is fed to the $CO_2$ separating device 1. A product gas PG and a tail gas TG, containing $CO_2$, are thereby formed, said tail gas first being temporarily stored in a gas accumulator 14. The volume of the gas accumulator 14 is chosen such that fluctuations in the composition of the tail gas are largely balanced out. The tail gas TG is first compressed to a pressure of 6 to 12 bar by way of a compressor 6, which may, for example, be formed as a two-stage screw compressor, a piston compressor or a multistage turbo compressor, and is fed to a burner system 2, in which the tail gas TG is mixed with gas containing oxygen $O_2$-G. Usually, technically pure oxygen is added for this purpose. The compression of the tail gas TG before the combustion makes it possible to provide the substitute gas with only a dewatering or cooling operation, so that a simple construction of the installation is possible.

Optionally, by way of a feed line 8, waste gas AG, such as for example top gas, offgas or surplus gas, may also be mixed directly with the tail gas and fed to the burner system 2.

The mixture of tail gas and gas containing oxygen $O_2$-G, and optionally waste gas AG, is then fed to a combustion chamber 3, in which the tail gas TG, and optionally the waste gas AG, are combusted largely completely, so that the substitute gas formed during the combustion has a high proportion of $CO_2$ and only small amounts of water vapor, nitrogen or oxygen. The substitute gas formed during the combustion is fed by way of the substitute gas line 4 to the dewatering device 5 and moisture is largely separated from the substitute gas by the latter. The combustion chamber may also be combined with the dewatering device 5 to form a structural unit. The dewatering device 5 may comprise a cooler or a waste-heat recovering device 11 and a condensate separator 12, the separated water being discharged as condensate by way of a line. In addition, a drying device 15 may be provided, in order to lower further the moisture content in the substitute gas below the dew point of the gas. The dried substitute gas may then be fed to an inert gas consumer IV or, after an increase in pressure by means of a sequestering compressor 17, to a $CO_2$ sequestration SQ.

Figure 2:
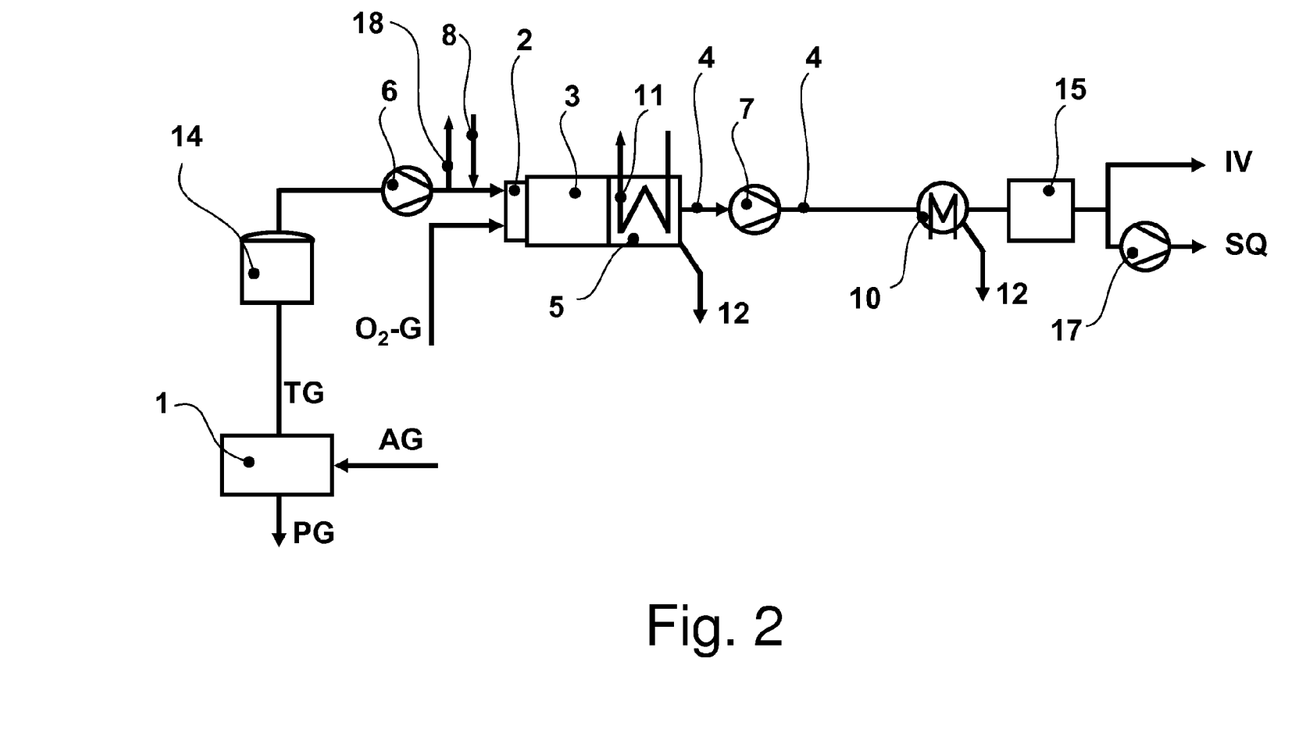

FIG. 2 is an alternative refinement, which differs from the installation shown in FIG. 1 by the fact that a blower 6 is provided for the slight compression of the tail gas TG to a pressure of approximately 0.1 to 0.3 bar. In addition, a compression of the substitute gas by means of a substitute gas compressor 7 takes place to a pressure of 6-12 bar. The substitute gas compressor 7 may be configured, for example, as a two-stage screw compressor, a piston compressor or a multi-stage turbo compressor.

Figure 3:
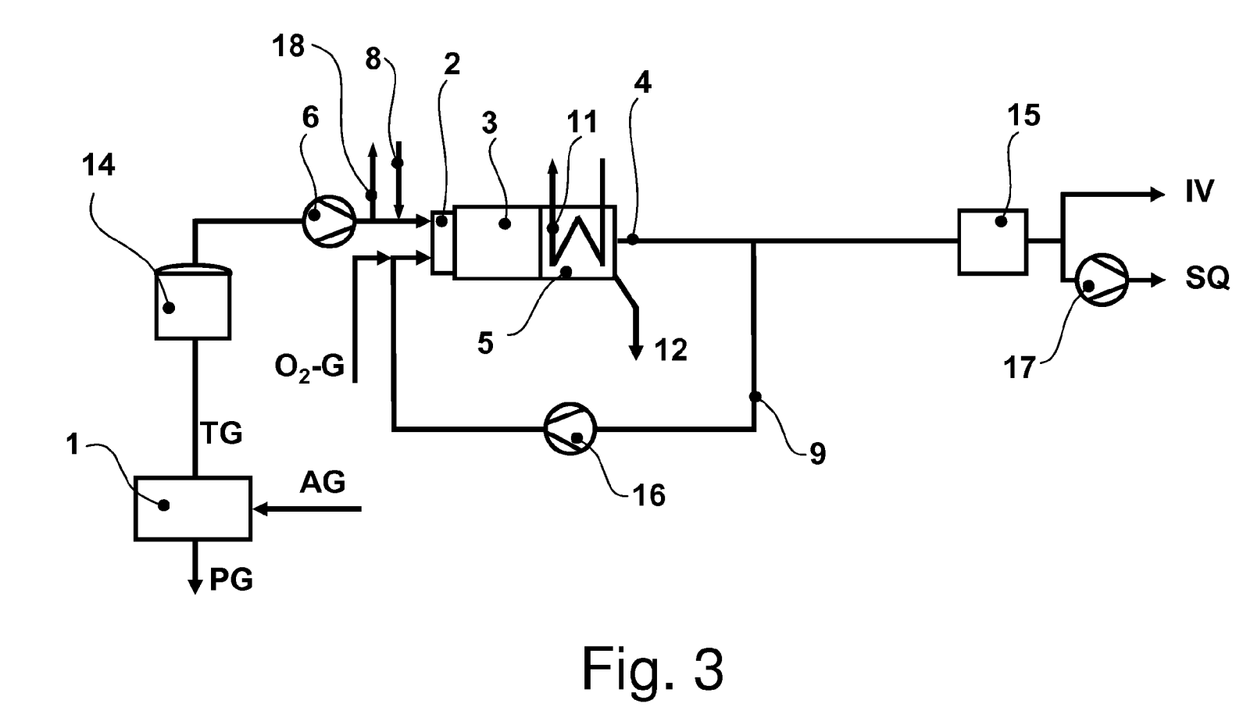
FIGS. 3 and 4: installations for producing substitute gas with return of substitute gas, in two embodiments.
Figure 4:
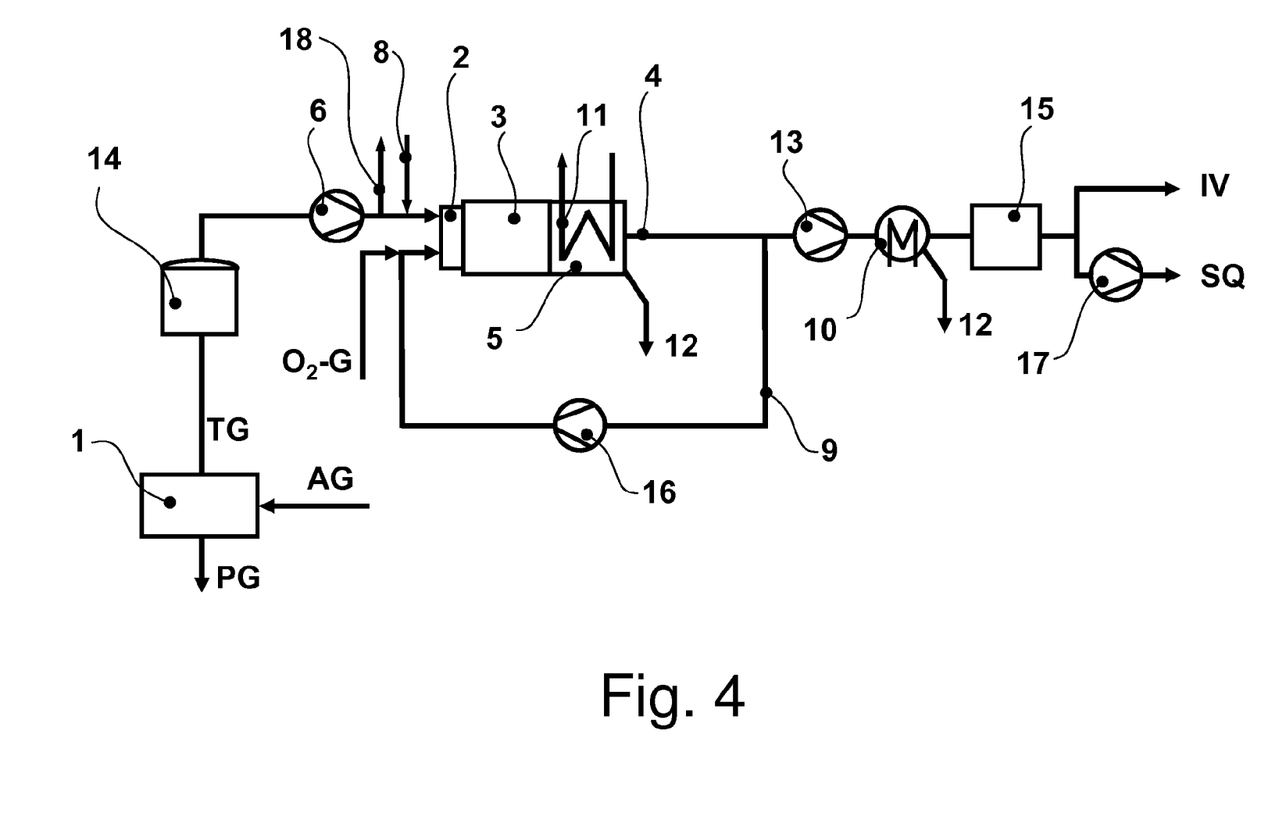

FIGS. 3 and 4 respectively show an installation according to various embodiments for producing substitute gas with return of substitute gas. Here, a return line 9 is respectively provided for returning part of the dewatered substitute gas into the burner system 2. This allows the combustion of the tail gas and the resultant flame temperature to be set. The return line 9 thereby branches off from the substitute gas line 4 downstream of the dewatering device 5.

According to FIG. 4, a further compressor 13, an additional dewatering device 10 and a drying device 15 may be provided downstream of the branching off of the return line 9 from the substitute gas line 4. By analogy with the refinement according to FIG. 2, a blower 6 is provided for the slight compression of the tail gas TG to a pressure of approximately 0.1 to 0.3 bar, and a further compressor 13 is provided for compression to a pressure of 6 to 12 bar.

It is optionally possible for all the refinements according to one of FIGS. 1 to 4 for a starting-up or amount-balancing line 18 to be provided downstream of the blower or the compressor 6. This line serves the purpose of admixing the amount of tail gas that is not used for producing substitute gas or for sequestration with a stream of export gas which is, for example, emitted from a reduction process. Alternatively, the starting-up or amount-balancing line 18 may also be arranged downstream of the gas accumulator 14 or the blower or the compressor 6, in order to carry away the unrequired tail gas TG here.

For the conveyance or compression of the returned substitute gas, a compressor 16 may be provided in the return line 9. By way of a separate feed, the gas containing oxygen $O_2$-G is first mixed with the returned substitute gas and then introduced into the burner system 2. A further compressor 13, an additional dewatering device 10 and a drying device 15 may be provided downstream of the branching off of the return line 9.

In the case of the exemplary embodiments according to FIGS. 2 and 4, it is not necessary for the combustion chamber 3 and/or the cooler or the waste heat recovering device 11 to be designed as pressure vessels, since the pressure is in any case <0.5 bar.

LIST OF DESIGNATIONS

1 $CO_2$ separating device
2 burner system
3 combustion chamber
4 substitute gas line
5 dewatering device
6 blower or compressor
7 substitute gas compressor
8 feed line
9 return line
10 dewatering device
11 cooling and waste-heat recovering device
12 condensate separator
13 further compressor
14 gas accumulator
15 drying device
16 compressor
17 sequestering compressor
18 starting-up and amount-balancing line 18

What is claimed is:

1. A process for reducing particulate material containing iron oxide, comprising:

reducing the material containing iron oxide at least partially with reducing gas in a reducing zone, drawing off the gas produced during the reduction as waste gas and subsequently subjected the gas to $CO_2$ separation, in which a tail gas containing $CO_2$ is separated, in order to balance out fluctuations in the amount and calorific value, temporarily storing the tail gas in a gas accumulator, mixing the tail gas with a gas containing oxygen or pure oxygen, combusting the mixed tail gas in a burner system, thereby forming a substitute gas, the substitute gas being used after dewatering as a substitute for inert gas or instead of nitrogen, wherein at least part of the substitute gas being mixed with the gas containing oxygen and being returned to the burner system after at least one of dewatering and compression for setting the combustion temperature during the combustion of the tail gas.

2. The process according to claim 1, wherein, after combustion, the substitute gas is cooled in at least one stage, in particular to a temperature of 20 to 60° C., and dewatered and compressed and optionally dried.

3. The process according to claim 1, wherein the combustion of the mixture of tail gas and gas containing oxygen takes place in a combustion chamber.

4. The process according to claim 1, wherein the tail gas is introduced into the burner system by means of a blower or a compressor, in particular with the amount being regulated by way of flowrate control.

5. The process according to claim 4, wherein the quantitative feeding of the returned substitute gas to the burner system takes place in such a way that the flame temperature is kept constant during the combustion of the gases.

6. The process according to claim 1, wherein, before the combustion, the tail gas is mixed with top gas, offgas or surplus gas from a reduction or smelting reduction, process.

7. The process according to claim 1, wherein the dewatered and compressed, and optionally dried, substitute gas is used in barrier gas systems of an oxide and/or coal charging operation or as propellant gas of a coal injection operation or for cooling burner lances or as a flushing and cooling gas or for controlling the flame temperature of a raceway or in burner systems or as a carrier gas for pneumatic conveyance.

8. The process according to claim 1, wherein the tail gas and/or the gas containing oxygen and/or the returned substitute gas is preheated before the combustion and using the waste heat produced during the combustion.

9. An installation for reducing particulate material containing iron oxide, with a reduction unit, in which the material containing iron oxide is at least partially reduced by means of a reducing gas and the reducing gas is drawn off as top gas, and with a $CO_2$ separating device for separating $CO_2$ from the top gas, thereby forming a tail gas containing $CO_2$, wherein there are provided a burner system for mixing the tail gas with a gas containing oxygen or pure oxygen, and optionally a gas accumulator for temporarily storing and homogenizing the tail gas before it is mixed with the gas containing oxygen, and a combustion chamber, into which these gases can be introduced and combusted, thereby forming a substitute gas, and discharged by way of a substitute-gas discharge line, wherein there is provided a cooling or waste-heat recovering device including a dewatering device for separating water from the substitute gas, so that a substitute for inert gas or for nitrogen is formed, wherein a return line is provided for returning part of the dewatered substitute gas and for introducing it into the burner system after admixing gas containing oxygen for setting the combustion temperature during the combustion of the tail gas, this line branching off from the substitute gas line downstream of the dewatering device.

10. The installation according to claim 9, wherein at least one compressor, which serves for compressing the mixture of tail gas and gas containing oxygen, and optionally returned substitute gas, is arranged between the gas accumulator and the burner system.

11. The installation according to claim 9, wherein at least one substitute gas compressor is provided for compressing the dewatered substitute gas.

12. The installation according to claim 9, wherein a blower or a compressor, and optionally a flowrate controller, is provided for feeding the tail gas into the burner system.

13. The installation according to claim 12, wherein a compressor for compressing the returned substitute gas is provided in the return line.

14. The installation according to claim 9, wherein a further dewatering device is provided for dewatering the compressed substitute gas.

15. The installation according to, claim 9, wherein the dewatering device comprises a cooling or waste-heat recovering device and a condensate separator for separating water from the substitute gas.

16. The installation according to claim 10, wherein a further compressor is arranged downstream of the branching off of the return line from the substitute gas line.

* * * * *